Oct. 26, 1954
W. L. HICKS
2,692,798
SPRAY AND AGITATOR APPARATUS
Filed Sept. 15, 1952
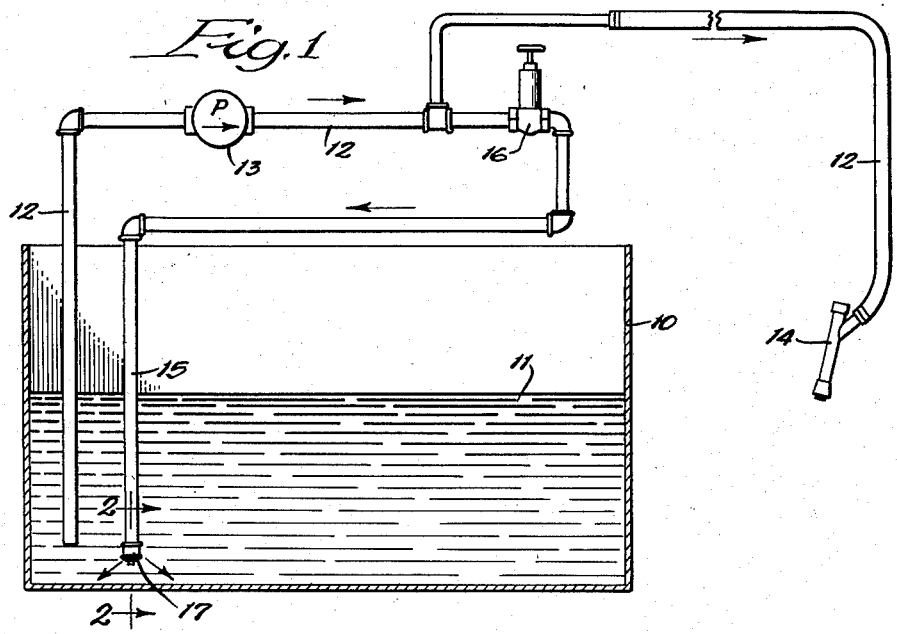
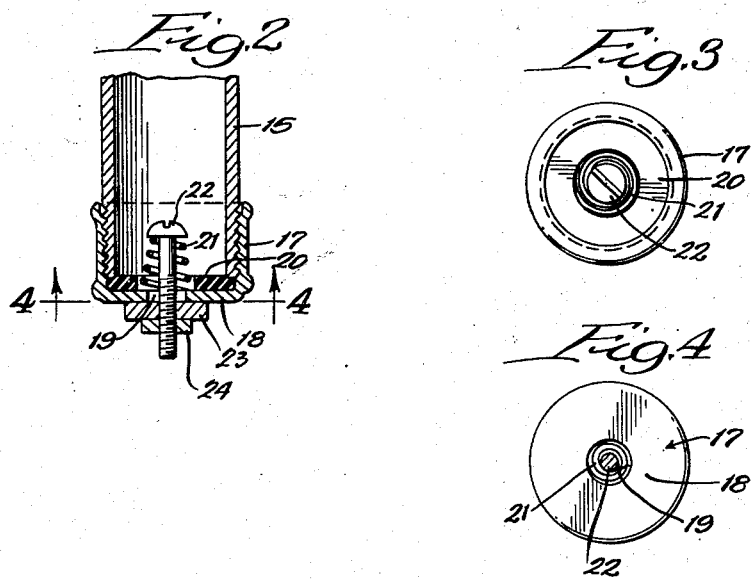
INVENTOR:
William L. Hicks,
BY Horace Dawson,
ATTORNEY.

Patented Oct. 26, 1954

2,692,798

UNITED STATES PATENT OFFICE 2,692,798

SPRAY AND AGITATOR APPARATUS

William L. Hicks, Cedar Rapids, Iowa

Application September 15, 1952, Serial No. 309,622

2 Claims. (Cl. 299—58)

This invention relates to spray and agitator apparatus, and more particularly to apparatus which permits a liquid from a container to be sprayed while at the same time utilizing a portion of the liquid placed under pressure for effectively stirring the liquid contents of the container. The invention is applicable to spray apparatus for paints, insecticides, herbicides, various chemicals, and any material requiring agitation to maintain a uniform mixture of the ingredients.

An object of the invention is to provide in a pressure spray apparatus means for utilizing a portion of liquid returned to the supply container to produce an effective agitation within the container. Another object is to provide with such a structure means for utilizing the return liquid stream to produce effective stirring of the contents of the container irrespective of the volume of the liquid being returned. Yet another object is to provide in such apparatus an agitator cap or jet whereby liquid escaping from the jet in the apparatus is varied in volume so as to produce effective stirring of the contents irrespective of volume of liquid returned. Other specific objects and advantages will appear as the specification proceeds.

The invention is shown, in an illustrative embodiment, by the accompanying drawing, in which—

Figure 1 is a side view in elevation of apparatus embodying my invention, the supply tank being shown in section; Fig. 2, an enlarged detail sectional view, the section being taken as indicated at line 2—2 of Fig. 1; Fig. 3, a bottom plan view of the structure shown in Fig. 2; and Fig. 4, a transverse sectional view, the section being taken as indicated at line 4—4 of Fig. 2.

Any suitable apparatus for containing the liquid to be sprayed and for forcing a stream of the liquid to a spray nozzle while returning a portion of the contents of the tank may be employed. In the illustration given, 10 designates a tank which, for the purpose of illustration, is shown as a very simple container, partially filled with a liquid 11. The liquid may consist of paint, insecticide, herbicide, and a variety of chemicals or other materials which may be sprayed and which it is desired to agitate to maintain a uniform mixture. A pipe or conduit 12 leads from the tank 10 and a pump 13 is interposed therein for forcing the liquid under pressure through the conduit to a spray nozzle 14. I provide a second conduit 15 communicating with conduit 12 and extending downwardly and into the liquid 11 of container 10. A pressure relief valve 16 is interposed within pipe 15.

The apparatus so far described is well known in the art and need not be described in further detail. It is sufficient that the pump force liquid from the tank through a conduit 12 to a nozzle 14 and that a second or relief pipe 15 communicate with pipe 12 so as to return a portion of the liquid passing the relief valve 16 to the container. If the pipe 15, as in the usual practice, however, is simply an open pipe, it is found that very little stirring action occurs unless a very heavy volume of liquid happens to be returned. Since in normal operation it often happens that a very small amount of liquid is returned through the pipe 15, substantial periods occur where there is no effective agitation within the tank.

I have discovered that effective agitation can be maintained within the tank 10, whether the volume of liquid passing the relief valve 16 be small or great, by utilizing a pressure closure valve which opens in response to the volume of the liquid being discharged from the pipe 15. If a small volume is discharged, as, for example, one gallon per minute, the valve opens slightly and a thin stream of liquid is discharged with effective stirring action in the bottom of the tank. On the other hand, if a substantially large volume, such as, for example, fifteen gallons per minute, is discharged through pipe 15, the valve opens to a greater extent and a larger volume of liquid is utilized in the stirring action. While heretofore the small amount of liquid passing from the pipe 15 into tank 10 through an open pipe had substantially no stirring or agitating effect, I now find that such small volume, when passed between the discharge cap and a spring-urged valve, forms a thin vigorous stream which produces very effective agitation, irrespective of its small volume.

In the specific form illustrated, the agitator jet comprises a cap 17 having a sleeve portion threadably engaging the bottom of the pipe 15 and providing a bottom flange 18 apertured at 19. Within the cap 17, I prefer to employ a rubber gasket 20 or other means for sealing the connection between pipe 15 and the cap 17. Resting upon the flange 18 and extending about the aperture 19 is a compression spring 21, which bears upwardly against a screw 22. The screw passes through the aperture 19 and threadably engages a metal valve plate 23. A nut 24 secures the valve 23 in a fixed position upon screw 22. With this structure, the spring 21 normally urges the screw 22 upwardly and draws the valve 23 tightly against the bottom of the apertured flange 18.

In operation, the tank 11 is filled with a liquid mixture such as paint, insecticide, herbicide, or other chemicals or materials requiring agitation to maintain a uniform mixture. The pump 13 draws a portion of the liquid upwardly through pipe 12 toward the discharge nozzle 14. In the operation of apparatus of this sort, it is common to support the apparatus upon a tractor and to drive pump 13 by a connection with the tractor, whereby the speed of the pump may be greater at one time than another. The pressure relief valve 16 permits excess liquid which is not utilized in the spray nozzle 14 to return through pipe 15 to the supply tank 10. The valve cap 17 tends to maintain the valve 23 in closed position, opening only slightly when the volume of liquid is small and to a greater extent when the volume of liquid being discharged is large. However, even when the volume of liquid discharged is small, the liquid is discharged under the full pressure of the pump in a thin channel between the plate 23 and the cap flange 18 so that a vigorous agitation is produced by the thin, high pressure stream. Thus, irrespective of the volume of liquid being discharged, an effective agitation in the bottom of the tank is brought about.

With the apparatus shown, the full force of the pump is utilized in discharging the thin stream from the valve cap 17 just as it is also utilized when a large volume of excess liquid passes the pressure relief valve 16 and in those periods of operation where the spray nozzle 14 is in constant use and only a small portion of liquid is returned through the nozzle 16. The small portion of the liquid is utilized to maintain a uniform mixture in the contents of the tank. It will be understood that the apparatus may be varied widely. The pump may be a piston or rotary type pump or any other suitable form of pump, and the spray nozzle and pressure relief valve may be of the usual or any suitable form of construction. The invention is applicable to any type of take-off sprayer or spray system in which pressure is employed in connection with a pressure relief valve for returning a portion of the liquid to the tank.

While in the foregoing specification I have set forth a specific structure in considerable detail for the purpose of illustrating an embodiment of the invention, it will be understood that such details of structure may be varied widely by those skilled in the art without departing from the spirit of my invention.

I claim:

1. In spray and agitator apparatus, a tank containing liquid to be sprayed and agitated, a spray nozzle, a pipe leading from said tank to the spray nozzle, a pump for forcing liquid through said pipe, a second conduit communicating with said first-mentioned pipe at a point between said pump and said nozzle and above said tank, a return pipe leading from said second conduit downwardly into said tank adjacent the bottom thereof, an agitator cap secured to the lower end of said return pipe and having a sleeve portion threadedly engaging the lower end of said return pipe and a bottom closure having a central aperture therethrough, a plate disk resting against the bottom of said cap closure and extending over said aperture, a compression spring within said cap urging said disk against the bottom closure to normally seal said aperture, a screw member extending through said aperture and providing a head engaging the upper end of said compression spring, said screw member extending through said disk, means engaging the lower end of said screw for retaining said screw in a position for maintaining said spring under compression, and a regulatable relief valve mounted in said conduit above said tank for controlling the pressure of the liquid passing through said agitator cap, whereby the pressure of the liquid flowing to said agitator cap may be held at a predetermined pressure irrespective of the pressure exerted by the pump in said first-mentioned pipe.

2. The structure of claim 1, in which the pump inlet pipe and agitator pipe are supported in said tank in closely-spaced relation.

References Cited in the file of this patent

UNITED STATES PATENTS

| Number | Name | Date |
|--------|------|------|
| 294,135 | Lambert et al. | Feb. 26, 1884 |
| 620,867 | Gardner | Mar. 7, 1899 |
| 803,090 | Bradford | Oct. 31, 1905 |
| 945,867 | Richter | Jan. 11, 1910 |
| 1,286,333 | Johnson | Dec. 13, 1918 |
| 1,706,418 | Sissom | Mar. 26, 1929 |
| 2,252,872 | Spreng | Aug. 19, 1941 |
| 2,462,034 | Zeck | Feb. 15, 1949 |